(12) United States Patent
Miyazawa et al.

(10) Patent No.: US 11,897,705 B2
(45) Date of Patent: Feb. 13, 2024

(54) WORKPIECE PROCESSING METHOD

(71) Applicant: SEIKO EPSON CORPORATION, Tokyo (JP)

(72) Inventors: Takao Miyazawa, Shimosuwa-Machi (JP); Mitsuhiro Yamamura, Suwa (JP); Noboru Asauchi, Yamagata-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 104 days.

(21) Appl. No.: 17/238,237

(22) Filed: Apr. 23, 2021

(65) Prior Publication Data

US 2021/0331874 A1 Oct. 28, 2021

(30) Foreign Application Priority Data

Apr. 24, 2020 (JP) .................................. 2020-077535

(51) Int. Cl.
*B65G 47/90* (2006.01)
*B23Q 5/22* (2006.01)

(52) U.S. Cl.
CPC .............. *B65G 47/90* (2013.01); *B23Q 5/22* (2013.01); *Y10T 29/49769* (2015.01); *Y10T 29/49998* (2015.01)

(58) Field of Classification Search
CPC ................................................. Y10T 29/49769
See application file for complete search history.

(56) References Cited

U.S. PATENT DOCUMENTS

| 4,691,426 | A | * | 9/1987 | Roucek | ................... | H05K 3/225 |
| | | | | | | 29/402.18 |
| 4,980,971 | A | * | 1/1991 | Bartschat | .............. | H01L 21/681 |
| | | | | | | 414/730 |
| 5,677,709 | A | * | 10/1997 | Miura | .................... | G02B 21/32 |
| | | | | | | 345/161 |
| 5,723,793 | A | * | 3/1998 | Suzuki | .................... | G01L 1/005 |
| | | | | | | 73/789 |
| 5,727,915 | A | * | 3/1998 | Suzuki | ..................... | B25J 15/02 |
| | | | | | | 901/47 |
| 7,906,076 | B2 | * | 3/2011 | Fischer | .................... | G01N 1/31 |
| | | | | | | 206/486 |
| 8,918,989 | B2 | * | 12/2014 | Burggraf | ................. | H01L 21/68 |
| | | | | | | 29/721 |
| 9,579,088 | B2 | * | 2/2017 | Farritor | .................. | A61B 34/74 |
| 10,245,734 | B2 | * | 4/2019 | Tanaka | ................... | B25J 9/1682 |
| 2004/0193305 | A1 | | 9/2004 | Hayashi | | |

(Continued)

FOREIGN PATENT DOCUMENTS

JP H9211338 A 8/1997
JP H10180660 A 7/1998

(Continued)

*Primary Examiner* — Sarang Afzali
(74) *Attorney, Agent, or Firm* — Yu Gang

(57) ABSTRACT

A workpiece processing method includes a carry-in step of carrying a workpiece into the field of view of a magnifier, a work step of performing predetermined work on the workpiece based on an image provided via the magnifier, and a carry-out step of carrying the workpiece out of the field of view of the magnifier. A robot performs at least one of the carry-in step and the carry-out step as well as the work step.

11 Claims, 12 Drawing Sheets

(56) References Cited

U.S. PATENT DOCUMENTS

| | | | |
|---|---|---|---|
| 2008/0173813 A1* | 7/2008 | Van De Water | G01N 23/04 |
| | | | 250/311 |
| 2013/0023052 A1 | 1/2013 | Tanaka | |
| 2014/0177932 A1 | 6/2014 | Milne et al. | |
| 2016/0064181 A1* | 3/2016 | Taheri | G02B 21/32 |
| | | | 250/442.11 |
| 2016/0379376 A1 | 12/2016 | Milne et al. | |
| 2016/0379377 A1 | 12/2016 | Milne et al. | |
| 2016/0379378 A1 | 12/2016 | Milne et al. | |
| 2018/0150965 A1 | 5/2018 | Milne et al. | |
| 2019/0094017 A1* | 3/2019 | Wakabayashi | B25J 19/022 |
| 2019/0225923 A1* | 7/2019 | Ang | H04N 23/695 |
| 2020/0182770 A1* | 6/2020 | Tokonami | B01L 3/50851 |
| 2021/0019905 A1 | 1/2021 | Milne et al. | |
| 2023/0038654 A1 | 2/2023 | Milne et al. | |

FOREIGN PATENT DOCUMENTS

| | | |
|---|---|---|
| JP | 2001100821 A | 4/2001 |
| JP | 2004298996 A | 10/2004 |
| JP | 2009211024 A | 9/2009 |
| JP | 2009211031 A | 9/2009 |
| JP | 2009269110 A | 11/2009 |
| JP | 2014525583 A | 9/2014 |
| WO | 2012018136 A1 | 2/2012 |

\* cited by examiner

WORKPIECE PROCESSING METHOD

The present application is based on, and claims priority from JP Application Serial Number 2020-077535, filed Apr. 24, 2020, the disclosure of which is hereby incorporated by reference herein in its entirety.

BACKGROUND

1. Technical Field

The present disclosure relates to a workpiece processing method.

2. Related Art

The robot system described in JP-A-2009-211024 includes a microscope and a pair of manipulators that manipulate a workpiece in the field of view of the microscope.

The robot system described in JP-A-2009-211024, however, has a problem of poor work efficiency because it is necessary to manually place a workpiece in the field of view of the microscope and transport the manipulated workpiece out of the field of view of the microscope.

SUMMARY

A workpiece processing method according to an application example of the present disclosure includes a carry-in step of carrying a workpiece into a field of view of a magnifier, a work step of performing predetermined work on the workpiece based on an image provided via the magnifier, and a carry-out step of carrying the workpiece out of the field of view of the magnifier, and a robot performs at least one of the carry-in step and the carry-out step as well as the work step.

DESCRIPTION OF EXEMPLARY EMBODIMENTS

Preferable embodiments of a workpiece processing method according to the present disclosure will be described below in detail with reference to the accompanying drawings.

First Embodiment

Figure 1:
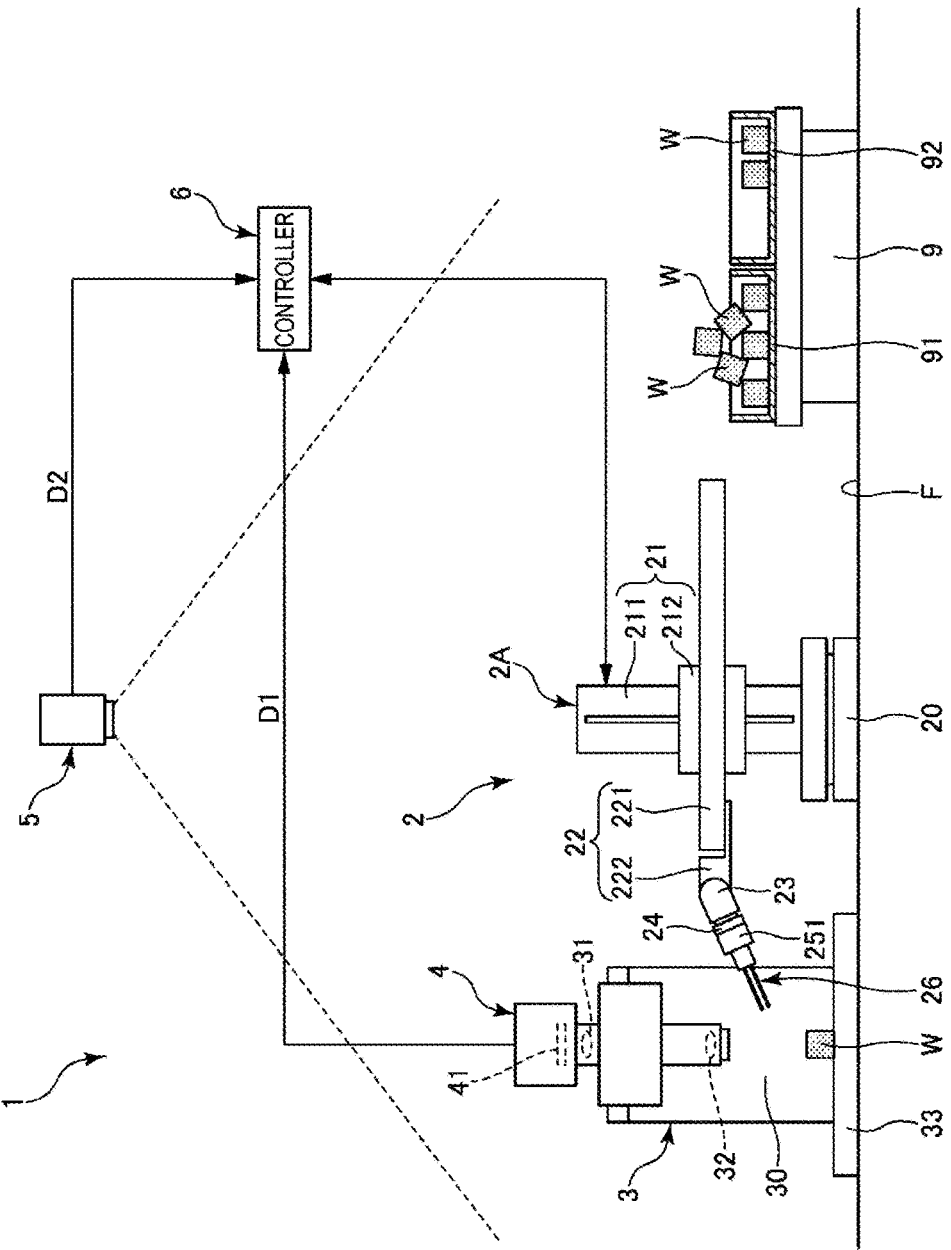
FIG. 1 is a configuration diagram showing a robot system that performs a workpiece processing method according to a first embodiment.
Figure 2:
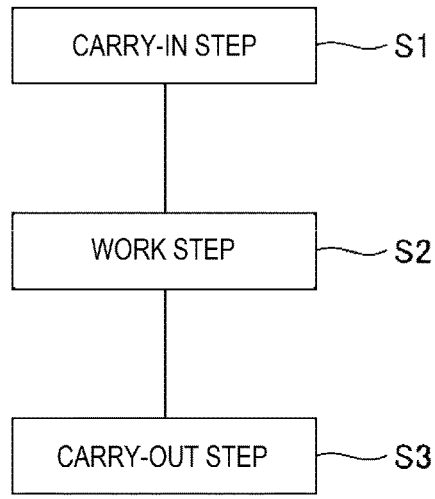
FIG. 2 is a flowchart showing steps contained in the workpiece processing method.
Figure 3:
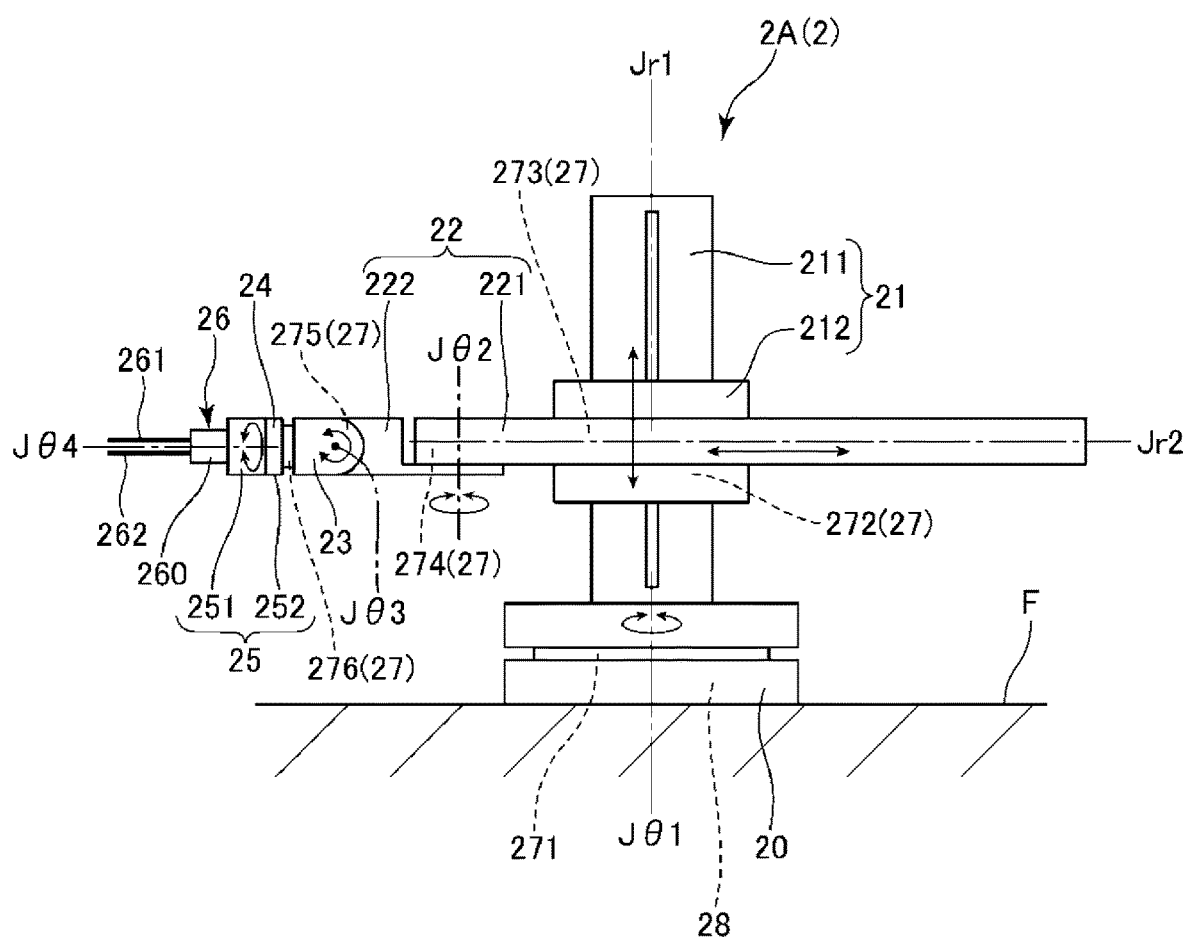
FIG. 3 is a side view showing a robot provided in the robot system shown in FIG. 1.
Figure 4:
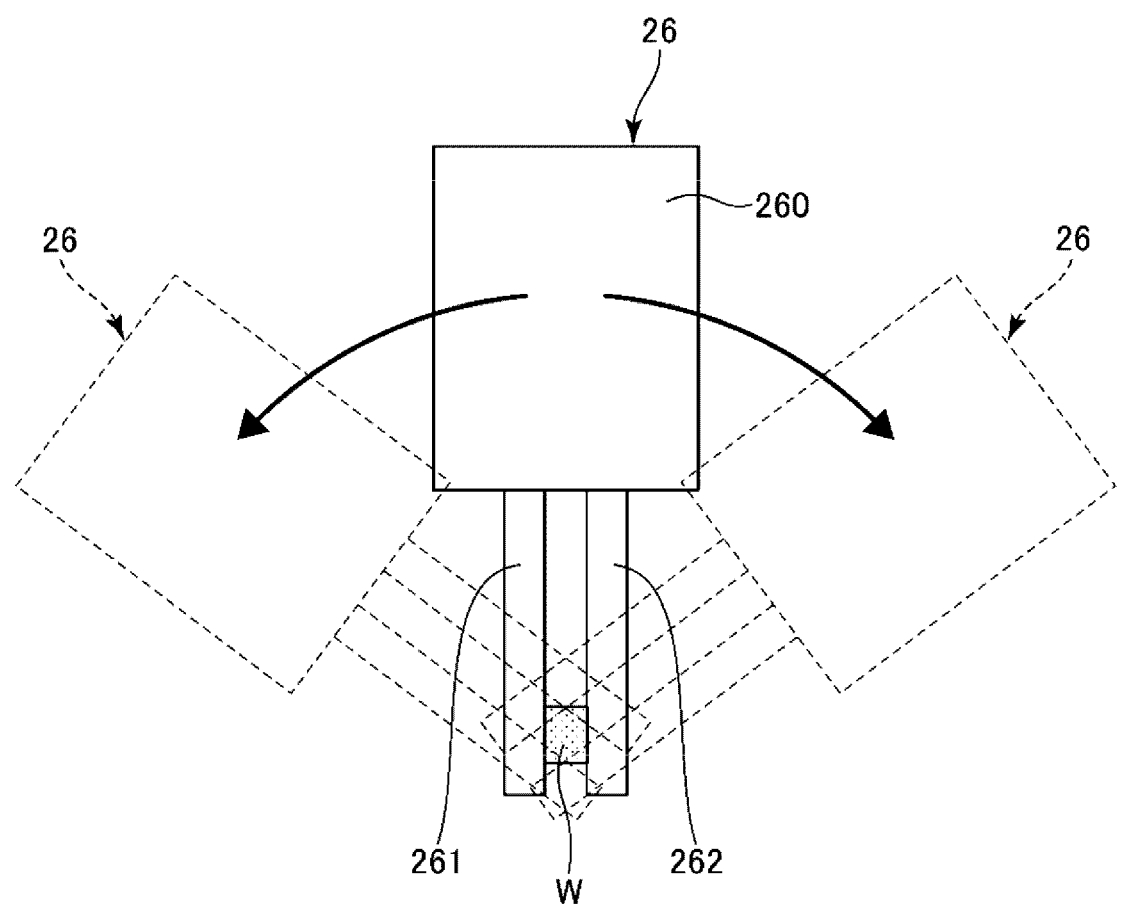
FIG. 4 is a diagrammatic view showing "eucentric motion" and viewed in the vertical direction.
Figure 5:
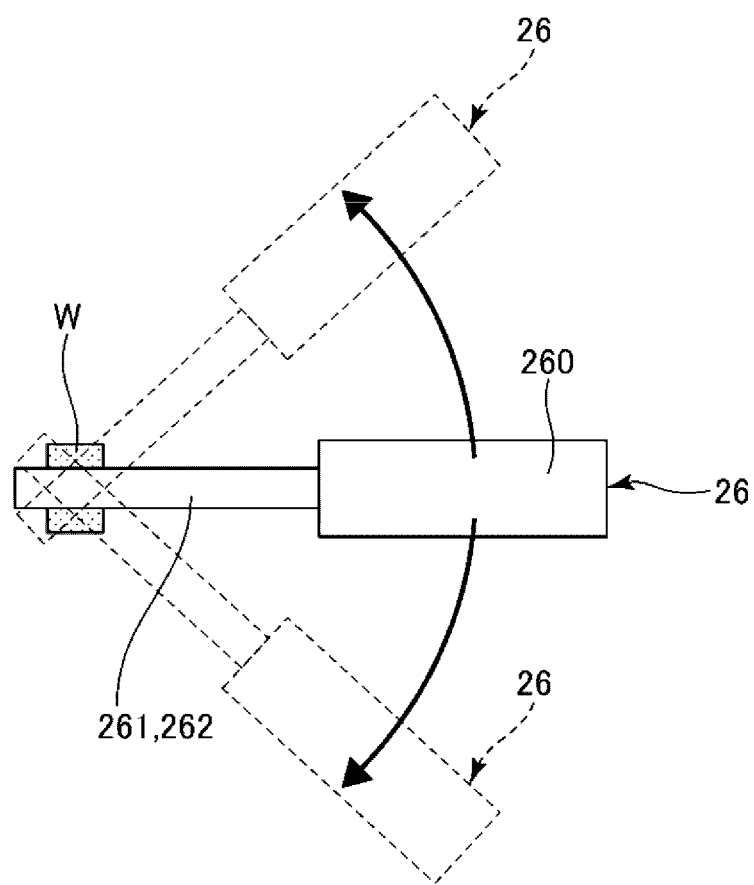
FIG. 5 is a diagrammatic view showing the "eucentric motion" and viewed in the horizontal direction.
Figure 6:
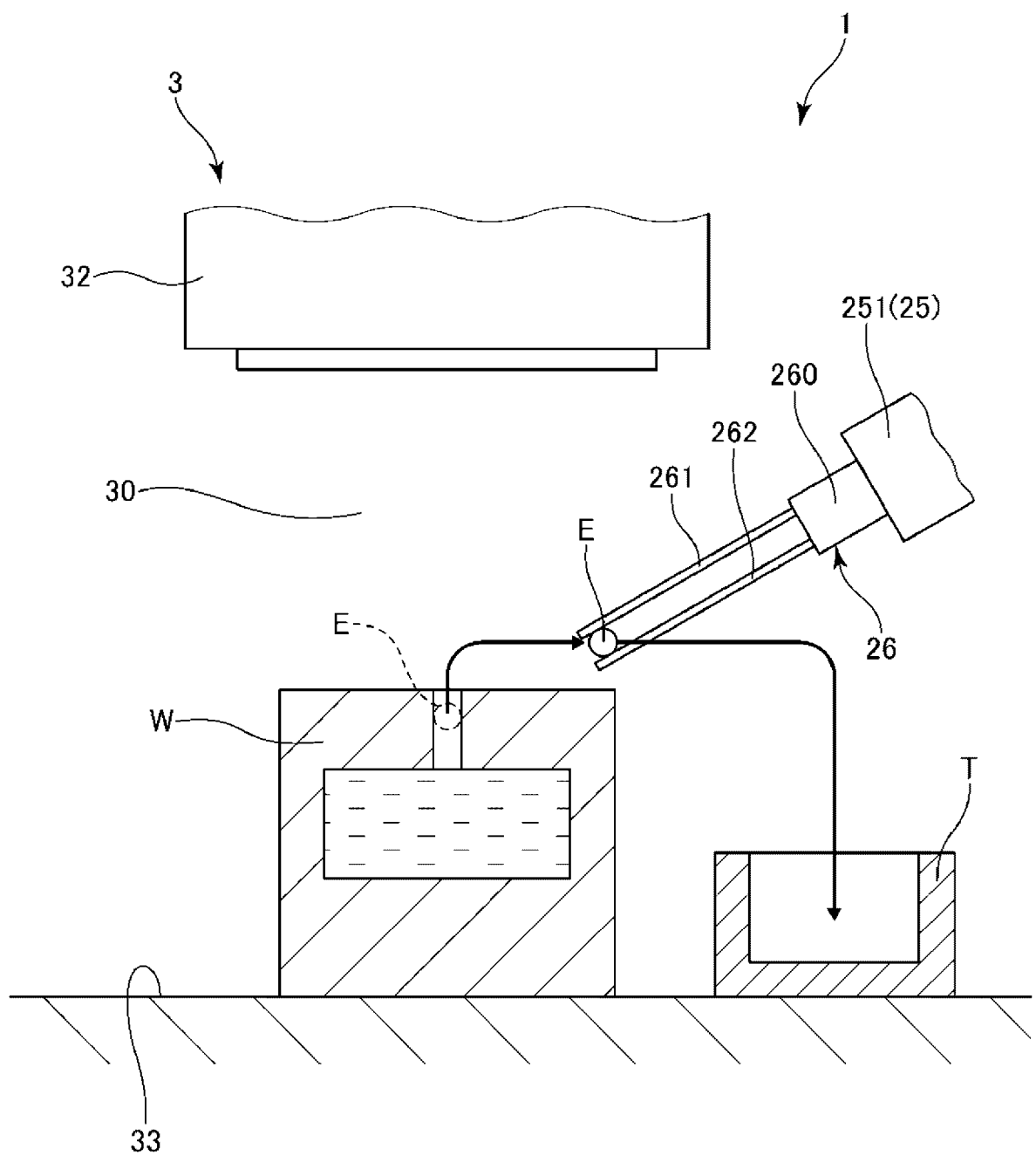
FIG. 6 is a side view showing a specific example of a work step.
Figure 7:
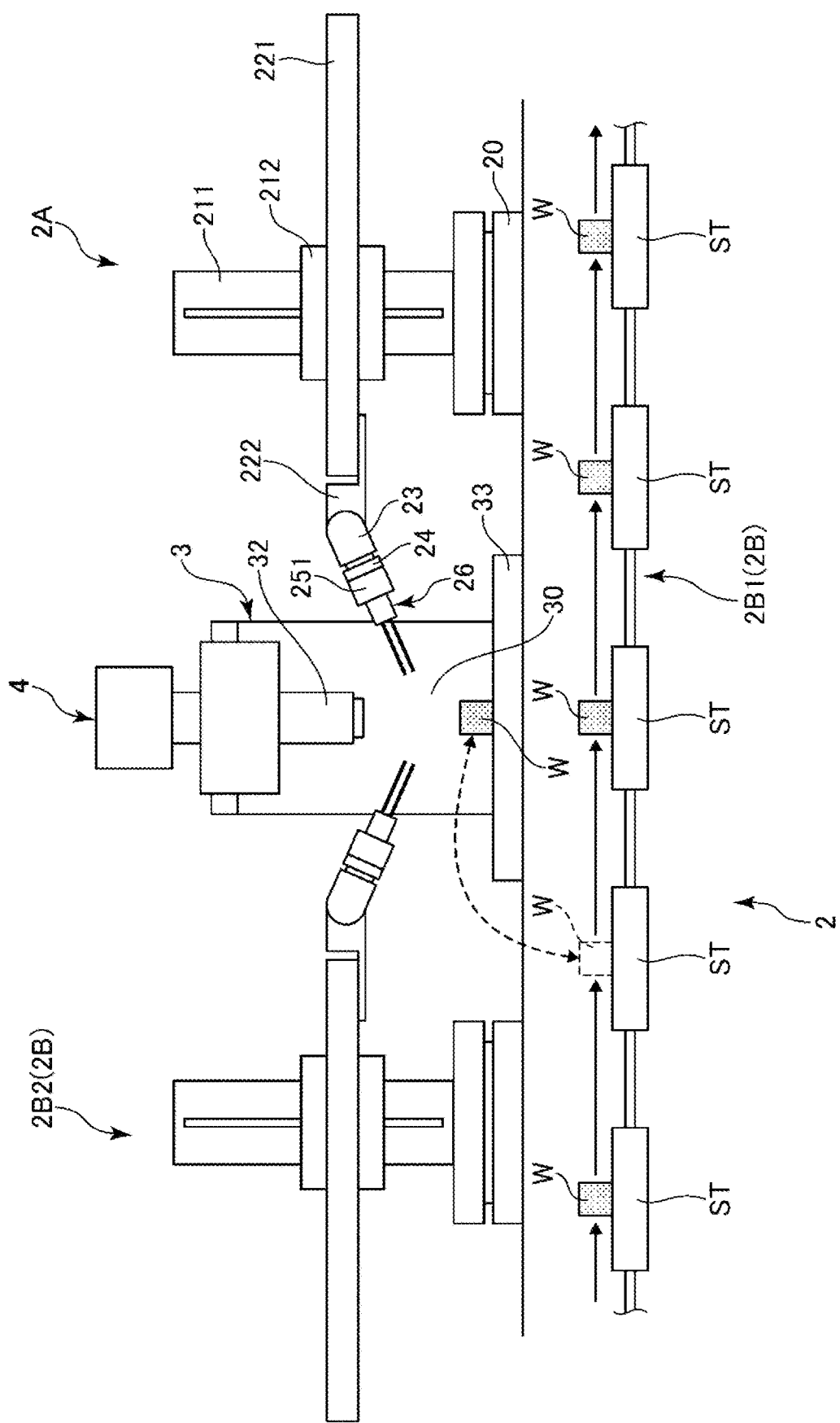
FIG. 7 is a configuration diagram showing a variation of the robot system shown in FIG. 1.
Figure 8:
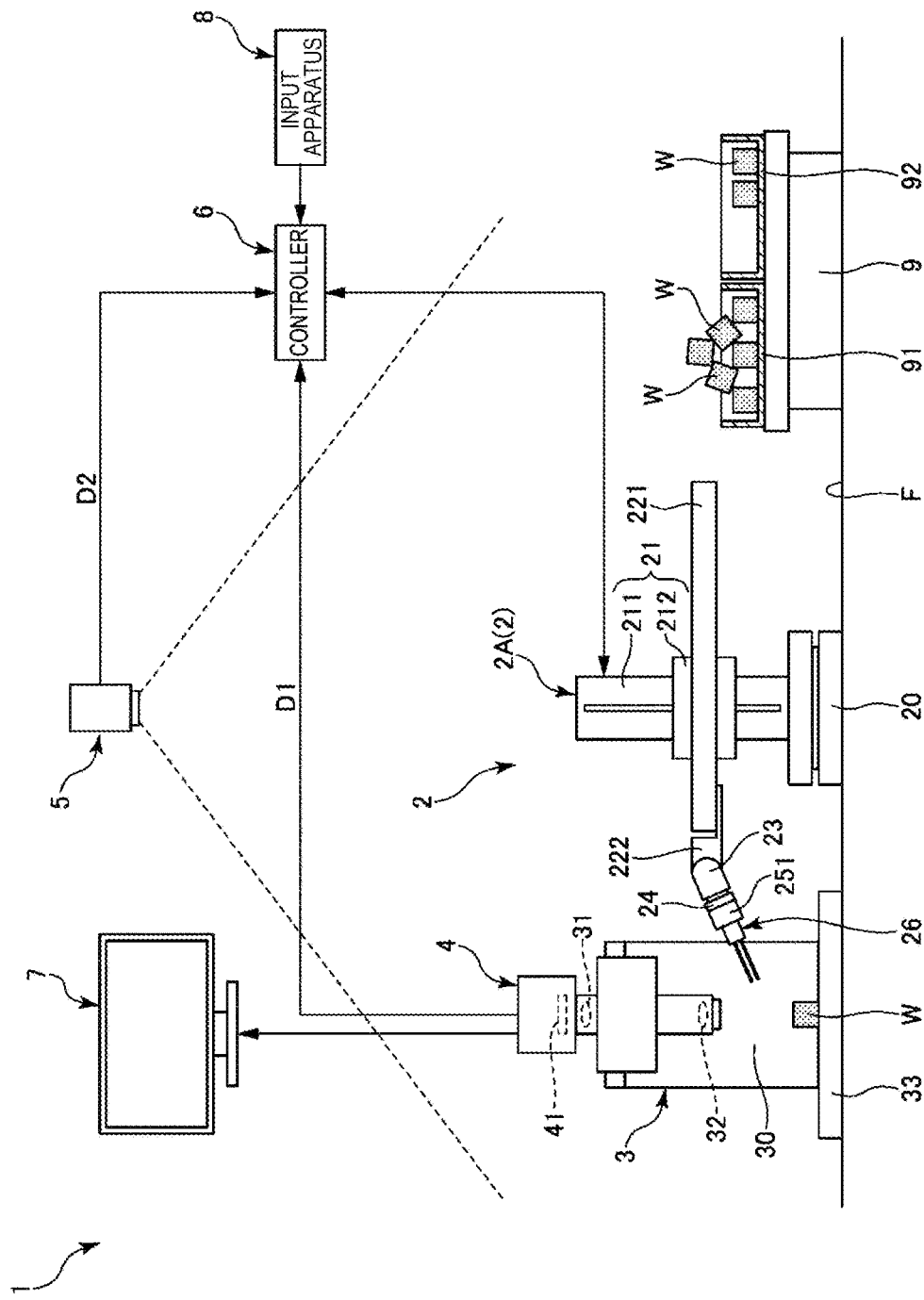
FIG. 8 is a configuration diagram showing another variation of the robot system shown in FIG. 1.

FIG. 1 is a configuration diagram showing a robot system that performs a workpiece processing method according to a first embodiment. FIG. 2 is a flowchart showing steps contained in the workpiece processing method. FIG. 3 is a side view showing a robot provided in the robot system shown in FIG. 1. FIG. 4 is a diagrammatic view showing "eucentric motion" and viewed in the vertical direction. FIG. 5 is a diagrammatic view showing the "eucentric motion" and viewed in the horizontal direction. FIG. 6 is a side view showing a specific example of a work step. FIGS. 7 and 8 are each a configuration diagram showing a variation of the robot system shown in FIG. 1. In the following description, the upper side in FIG. 1 is also called "above," and the lower side in FIG. 1 is also called "below" for convenience of description. Further, the term "parallel" includes a state in which two objects in question are completely parallel to each other and also a state in which two objects in question incline with respect to each other to the extent that the two objects can be recognized to be parallel to each other. The same holds true for the term "perpendicular."

The workpiece processing method according to the present embodiment is performed by a robot system 1 shown in FIG. 1. The robot system 1 includes a robot 2, a microscope 3 as a magnifier, a microscope camera 4 coupled to the microscope 3, a peripheral camera 5 as an imaging apparatus that captures an image of a region around the microscope 3, and a controller 6, which controls the operation of driving the robot 2 based on image data provided from the microscope camera 4 and the peripheral camera 5.

The workpiece processing method includes a carry-in step S1 of causing the robot 2 to carry a workpiece W outside the field of view of the microscope 3 into the field of view of the microscope 3 based on image data D2 provided from the peripheral camera 5, a work step S2 of causing the robot 2 to perform predetermined work on the workpiece W in the field of view of the microscope 3 based on image data D1 provided from the microscope camera 4, and a carry-out step S3 of causing the robot 2 to carry the worked workpiece W out of the field of view of the microscope 3 based on the image data D2 provided from the peripheral camera 5, as shown in FIG. 2. The workpiece processing method thus provides high work efficiency because the robot 2 performs all the steps, the carry-in step S1, the work step S2, and the carry-out step S3. In all the steps, the manpower for the work can be saved as compared with the manpower required in the related art because no manpower is required to perform the steps or assist the method to perform the steps.

The greater the magnification factor, the narrower the field of view of the microscope 3, and the narrower a work space 30 in the field of view, which is the space sandwiched between an objective lens 32 and a stage 33, which will be described later. It is therefore preferable to use the robot 2 configured to be suitable for narrow-space work.

The robot 2 includes a first work robot 2A, as shown in FIG. 1. The first work robot 2A is a selective compliance assembly robot arm robot (SCARA robot). The first work robot 2A includes a base seat 20, a first arm 21 coupled to the base seat 20, a second arm 22 coupled to the first arm 21, a third arm 23 coupled to the second arm 22, a fourth arm 24 coupled to the third arm 23, an end effector 26 coupled to the fourth arm 24 via a sensor 25, a drive mechanism 27, which drives the arms, and a robot controller 28, which controls the driving operation performed by the drive mechanism 27, as shown in FIG. 3.

The first arm 21 moves in a first linear motion axis Jr1 and pivots around a first pivotal axis J01 parallel to the first linear motion axis Jr1 relative to the base seat 20. The second arm 22 moves in a second linear motion axis Jr2, which is perpendicular to the first linear motion axis Jr1, and pivots around a second pivotal axis J02, which is parallel to the first pivotal axis J01, relative to the first arm 21. The third arm 23 pivots around a third pivotal axis J03, which is perpendicular to the first linear motion axis Jr1, relative to the second arm 22. The fourth arm 24 pivots around a fourth pivotal axis J04, which is perpendicular to the third pivotal axis J03, relative to the third arm 23.

As described above, the first work robot 2A operates the end effector 26 based on the combination of the motion around the four pivotal axes and the motion in the two linear motion axes. The first work robot 2A therefore has a larger number of motion allowing axes as compared with a SCARA robot in the related art that operates based on the combination of motion around three pivotal axes and motion in one linear motion axis, and the first work robot 2A operates the end effector 26 with increased flexibility, particularly, approaches the workpiece W with increased flexibility accordingly. The first work robot 2A can therefore perform a wider variety of types of work and a broader range of work according to a user's request on the workpiece W.

The first work robot 2A, which approaches the workpiece W with high flexibility, is a robot suitable for narrow-space work, which is likely to limit the approach direction, that is, work in the field of view of the microscope 3. Further, when the first arm 21 pivots around the first pivotal axis J01, the radius of the pivotal motion of the end effector 26 can be shortened by retracting the second arm 22 toward the proximal end along the second linear motion axis Jr2. The first work robot 2A is therefore a robot that is unlikely to interfere with an obstacle around the first work robot 2A, that is, the microscope 3 even when the first work robot 2A is installed in a narrow space. It can be said also in this regard that the first work robot 2A is a robot suitable for narrow-space work.

In particular, the first work robot 2A allows the end effector 26 to readily rotate around the distal end of the end effector 26 or the workpiece W gripped by the end effector 26, as shown in FIGS. 4 and 5. The first work robot 2A therefore excels in changing only the attitude of the workpiece W with the position thereof maintained at the location where the workpiece W is present. The first work robot 2A is therefore a robot more suitable for work in a narrow field of view, such as assembly of the workpiece W, removable of foreign matter from the workpiece W, and inspection of the workpiece W in the field of view of the microscope 3. The motion described above will be also referred below to as "eucentric motion" for convenience of description.

The base seat 20 is fixed to an installation surface F, as shown in FIG. 3. The installation surface F is not limited to a specific surface and may, for example, be a floor, a wall, a ceiling, the upper surface of a stand, and the upper surface of a movable cart. The installation surface F is not necessarily a horizontal surface and may, for example, be a vertical surface or an inclining surface that inclines with respect to the horizontal and vertical planes. The term "horizontal" in association with the first work robot 2A means that the first work robot 2A is parallel to the installation surface F.

The first arm 21 includes a first pivotal section 211, which is so coupled to the base seat 20 as to be pivotable around the first pivotal axis J01, and a first moving section 212, which is movable in the first linear motion axis Jr1 relative to the first pivotal section 211. The first pivotal section 211 is so disposed as to be juxtaposed with the base seat 20 in the first pivotal axis J01, and the first moving section 212 is so disposed as to be juxtaposed with the first pivotal section 211 in a direction perpendicular to the first pivotal axis J01. The second arm 22 includes a second moving section 221, which is so coupled to the first moving section 212 as to be movable in the second linear motion Jr2, and a second pivotal section 222, which is so coupled to the second moving section 221 as to be pivotable around the second pivotal axis J02. The second moving section 221 is so disposed as to be juxtaposed with the first moving section 212 in a direction perpendicular to the first pivotal axis J01, and the second pivotal section 222 is so disposed as to be juxtaposed with the second moving section 221 in the second linear motion axis Jr2.

The third arm 23 is so coupled to the second pivotal section 222 as to be pivotable around the third pivotal axis J03. The third arm 23 is so disposed as to be juxtaposed with the second pivotal section 222 in a direction perpendicular to the second pivotal axis J02. The fourth arm 24 is so coupled to the third arm 23 as to be pivotable around the fourth pivotal axis J04. The fourth arm 24 is so disposed as to be juxtaposed with the third arm 23 in the direction of the fourth pivotal axis J04. Therefore, in the attitude shown in FIG. 3, the second pivotal section 222, the third arm 23, and the fourth arm 24 are laterally arranged in a row. The height of the second arm 22, the third arm 23, and the fourth arm 24 can thus be suppressed, whereby a distal end portion of the first work robot 2A can be laterally elongated. Therefore, for example, work in a narrow space that imposes a limit in the height direction, that is, the work space sandwiched between the objective lens 32 and the stage 33 is readily performed.

The sensor 25 detects whether the first work robot 2A has come into contact with an object and whether an object has approached the first work robot 2A. The thus functioning sensor 25 includes a force sensor 251, which detects whether the first work robot 2A has come into contact with an object, and a proximity sensor 252, which detects whether an object has approached the first work robot 2A.

The force sensor 251 is provided between the fourth arm 24 and the end effector 26 and detects force acting on the end effector 26. The force sensor 251 can therefore detect the state of the workpiece W gripped by the end effector 26 and contact between the end effector 26 and an object therearound, in particular, the microscope 3 based on the output from the force sensor 251. The precision at which the workpiece W is handled is thus improved.

On the other hand, the proximity sensor 252 is disposed at the side surface of the fourth arm 24 and detects whether an object, in particular, the microscope 3 has approached the first work robot 2A. The proximity sensor 252 can therefore cause the first work robot 2A to take an avoidance action of avoiding contact with the microscope 3 before the first work robot 2A comes into contact with the microscope 3 or minimizing the impact and damage due to the contact. Further, the proximity sensor 252 can bring the first work robot 2A to an emergency halt before the first work robot 2A comes into contact with a worker who works with the robot. A safe first work robot 2A is thus provided. Further, damage of the microscope 3 or injury to the worker can be effectively suppressed.

The arrangement and configuration of the sensor 25 are, however, not limited to a specific arrangement and configuration. The sensor 25 may be omitted.

The end effector 26 is coupled to the fourth arm 24 via the force sensor 251. The end effector 26 is a mechanism that causes the first work robot 2A to perform predetermined work and is replaced as appropriate in accordance with the content of the work with an end effector suitable for the work. Examples of the end effector 26 may include a configuration in which a plurality of fingers are provided and used to grip the workpiece W, a configuration in which a screwdriver, a cutter, a drill, or any other tool is used to assemble or process the workpiece W, a configuration in which a capillary for wire bonding is provided and bonds wires to the workpiece W, a configuration in which an air chuck, an electromagnetic chuck, or any other chuck holds the workpiece W, a configuration in which a dispenser or any other component applies adhesive or any other material to the workpiece W, a configuration in which a pipette or any other component supplies the workpiece W with a predetermined liquid or the like, a configuration in which a vibrator causes the workpiece W to vibrate, and a configuration in which the workpiece W is painted with an air brush or any other component.

In the present embodiment, the end effector 26 that grips the workpiece W is used. The thus functioning end effector 26 includes a base 260 and a pair of fingers 261 and 262 coupled to the base 260. Distal end portions of the pair of fingers 261 and 262 can be caused to approach each other to grip the workpiece W, whereas the distal end portions of the pair of fingers 261 and 262 can be caused to separate from each other to release the gripped workpiece W.

The drive mechanism 27 includes a first drive mechanism 271, which causes the first pivotal section 211 to pivot around the first pivotal axis J$\theta$1 relative to the base seat 20, a second drive mechanism 272, which moves the first moving section 212 in the first linear motion axis Jr1 relative to the first pivotal section 211, a third drive mechanism 273, which moves the second moving section 221 in the second linear motion axis Jr2 relative to the first moving section 212, a fourth drive mechanism 274, which causes the second pivotal section 222 to pivot around the second pivotal axis J$\theta$2 relative to the second moving section 221, a fifth drive mechanism 275, which causes the third arm 23 to pivot around the third pivotal axis J$\theta$3 relative to the second pivotal section 222, and a sixth drive mechanism 276, which causes the fourth arm 24 to pivot around the fourth pivotal axis J$\theta$4 relative to the third arm 23.

The drive mechanisms 271 to 276 are each formed of a piezoelectric motor including a piezoelectric actuator and a driven section that is displaced by drive force produced by the piezoelectric actuator. The thus configured piezoelectric motor requires no speed reducer because the piezoelectric actuator comes into contact with the driven section and the drive force produced by the piezoelectric actuator is directly transmitted to the driven section. Further, the frictional force between the driven section and the piezoelectric actuator holds the position of the driven section, whereby no brake mechanism is required. Therefore, the drive mechanisms 271 to 276 can be simplified, and the sizes thereof can be reduced. Further, a decrease in work precision due to backlash or insufficient rigidity, which is a problem with a relay mechanism, such as a speed reducer, is substantially eliminated, whereby the first work robot 2A having excellent work precision is provided.

In particular, when the sixth drive mechanism 276, which is located in a position closest to the end effector 26, is formed of the piezoelectric motor, the size of the distal end portion of the first work robot 2A can be reduced, so that the distal end section of the first work robot 2A is unlikely to interfere with the microscope 3 when the end effector 26 approaches the workpiece W. The first work robot 2A suitable for work in a narrow space in the field of view of the microscope 3 is therefore provided. The drive mechanisms 271 to 276, however, do not necessarily have a specific configuration.

The robot controller 28 controls the drive mechanisms 271 to 276 independently based on instructions from the controller 6. The robot controller 28 is formed, for example, of a computer and includes a processor that processes information, a memory communicably connected to the processor, and an interface with external apparatuses. The memory saves a variety of programs executable by the processor, and the processor can read and execute the variety of programs and other pieces of information stored in the memory.

The configuration of the first work robot 2A has been briefly described above. The first work robot 2A, however, does not necessarily have a specific configuration.

The configurations other than the first work robot 2A will next be sequentially described. The microscope 3 is an optical microscope and includes a projection lens 31, the objective lens 32, and the stage 33, on which the workpiece W is placed. The space between the objective lens 32 and the stage 33 forms the work space 30. The thus configured microscope 3 allows magnified observation of the workpiece W in the work space 30 with the aid of the projection lens 31 and the objective lens 32. The microscope 3 has a variable magnification factor. The magnification factor can therefore be changed in accordance with the size of the workpiece W or the content of work, whereby the work can be precisely performed.

The stage 33 may be immobile or movable. For example, assuming that two axes extending along the horizontal direction and perpendicular to each other are axes X and Y and an axis perpendicular to the axes X and Y and extending along the vertical direction is an axis Z, the stage 33 may be movable independently in each of the directions of the axes X, Y, and Z and pivotable independently around each of the axes X, Y, and Z. The stage 33 can therefore also change the position and attitude of the workpiece W. The end effector 26 therefore approaches the workpiece W with remarkably improved flexibility. The stage 33 has six motion allowing axes in the example described above, but the number of motion allowing axes is not limited to a specific number and may be five or fewer or seven or greater. The stage 33 may be provided with a temperature adjustment mechanism that controls the temperature of the workpiece W.

The microscope camera 4 is coupled to the microscope 3, as shown in FIG. 1. The microscope camera 4, specifically, an imaging device 41 built therein captures an image of the workpiece W located in the field of view of the microscope 3 via the projection lens 31 and the objective lens 32. The image data D1 acquired by the microscope camera 4 is sent to the controller 6. The controller 6 controls the operation of driving the first work robot 2A based on the image data D1 to perform the work step S2. The microscope camera 4 is not limited to a specific camera and may, for example, be a 2D camera using one imaging device or a 3D camera using two imaging devices and capable of measuring the distance to a target object based on parallax between images captured with the two imaging devices. When the microscope camera 4 is a 3D camera, the amount of shift in the height direction between the workpiece W and the end effector 26 can, for example, be measured, whereby the work step S2 can be precisely performed. The microscope camera 4 may be replaced, for example, with a sensor having the function of the microscope camera 4.

The thus configured microscope 3 and microscope camera 4 form an enlargement unit that allows observation of the workpiece W placed in an enlarged field of view, and the enlargement unit does not necessarily have a specific configuration. For example, the microscope 3 may be replaced, for example, with a magnifying glass. The enlargement unit may instead be an electron microscope, such as a transmission electron microscope (TEM) and a scanning electron microscope (SEM). Any of the electron microscopes allows enlarged observation of the workpiece W at a magnification higher than that of an optical microscope.

The peripheral camera 5 is disposed in a position above the microscope 3 and captures an image of a region outside the field of view of the microscope 3, in particular, a region around the microscope 3. The image data D2 acquired by the peripheral camera 5 is then sent to the controller 6. The controller 6 controls the first work robot 2A based on the image data D2 to perform the carry-in step S1 and the carry-out step S3. The peripheral camera 5 is not limited to a specific camera and may, for example, be a 2D camera using one imaging device or a 3D camera using two imaging devices and capable of measuring the distance to a target object based on parallax between images captured with the two imaging devices. When the peripheral camera 5 is a 3D camera, the height of the end effector 26 and the amount of shift in the height direction between the workpiece W and the end effector 26 can, for example, be measured, whereby the carry-in step S1 and the carry-out step S3 can be precisely performed.

The thus configured peripheral camera 5 may be replaced with a sensor having the function described above, for example, a scanning-type 3D sensor. The peripheral camera 5 may be omitted. When the peripheral camera 5 is omitted, the position of the workpiece W to be carried into the field of view of the microscope 3 and the position to which the workpiece W is carried out of the field of view of the microscope 3 may be set as known values, and the carry-in step S1 and the carry-out step S3 may be performed only by controlling the position of the first work robot 2A based on the information on the positions.

The controller 6 controls the operation of driving the first work robot 2A based on the image data D1 acquired by the microscope camera 4 and the image data D2 acquired by the peripheral camera 5. Specifically, the controller 6 performs the carry-in step S1 by controlling the operation of driving the first work robot 2A based on the image data D2 to cause the first work robot 2A to grip the workpiece W outside the field of view of the microscope 3 and transport the workpiece W into the field of view of the microscope 3. The controller 6 further performs the work step S2 by controlling the operation of driving the first work robot 2A based on the image data D1 to cause the first work robot 2A to perform predetermined work on the workpiece W. The controller 6 further performs the carry-out step S3 by controlling the operation of driving the first work robot 2A based on the image data D2 to cause the first work robot 2A to transport the workpiece W having undergone the work step S2 out of the field of view of the microscope 3. The workpiece processing method according to the present embodiment thus provides high work efficiency because the first work robot 2A performs all the carry-in step S1, the work step S2, and the carry-out step S3. No manpower is required in all the steps, whereby the manpower for the work can be saved.

The thus functioning controller 6 is formed, for example, of a computer and includes a processor that processes information, a memory communicably connected to the processor, and an interface with external apparatuses. The memory saves a variety of programs executable by the processor, and the processor can read and execute the variety of programs and other pieces of information stored in the memory.

The robot system 1 has been described. The workpiece processing method performed by the robot system 1 will next be described.

Carry-in Step S1

In the carry-in step S1, the first work robot 2A grips the workpiece W outside the field of view of the microscope 3 and transports the gripped workpiece W into the field of view of the microscope 3. In the configuration shown in FIG. 1, the workpiece W is placed in a tray 91 on a placement seat 9. The controller 6 first detects the shape, position, and attitude of the workpiece W in the tray 91, whether or not an obstacle is present around the workpiece W, and other factors based on the image data D2 acquired by the peripheral camera 5. The controller 6 then produces a drive path along which the first work robot 2A is driven and which allows the first work robot 2A to appropriately grip the workpiece W based on the detected information on the workpiece W and controls the operation of driving the first work robot 2A in such a way that the first work robot 2A moves along the drive path. The first work robot 2A thus grips the workpiece W in the tray 91 and carries the workpiece W into the field of view of the microscope 3.

Work Step S2

In the work step S2, the first work robot 2A performs predetermined work on the workpiece W carried into the field of view of the microscope 3. The predetermined work may be any work, for example, regripping the workpiece W in the work space 30, changing the position or attitude of the workpiece W in the work space 30, pressing the workpiece W against the stage 33, striping or removing a predetermined member from the workpiece W, sticking, hooking, fitting, or fastening a predetermined member to the workpiece W, cutting the workpiece W, pulling the workpiece W, and swinging the workpiece W.

Foreign matter E is removed from the workpiece W particularly in the present embodiment. When the first work robot 2A can perform such work, the number of types of workpiece W that the first work robot 2A can handle increases, resulting in enhancement of the convenience provided by the work processing method. Specifically, the controller 6 first controls the operation of driving the first work robot 2A based on the image data D1 to use the first work robot 2A to place the workpiece W in a predetermined attitude and in a predetermined position on the stage 33. In this process, a position and an attitude that allow observation of the foreign matter E are achieved based on the image data D1. The controller 6 then controls the operation of driving the first work robot 2A based on the image data D1 acquired by the microscope camera 4 to use the first work robot 2A to remove the foreign matter E from the workpiece W, as shown in FIG. 6.

The workpiece W is not limited to a specific workpiece and can, for example, be an inkjet head for an inkjet printer. In this case, the foreign matter E can, for example, be foreign matter with which the ink discharge nozzle has been clogged, for example, dust and ink having coagulated. Removing the foreign matter E solves a clogged ink discharge nozzle. The work described above can be precisely performed in the field of view of the microscope 3 because the ink discharge nozzle is very small. In the present embodiment, a tray T as a container in which foreign matter is collected is disposed in the field of view of the microscope 3. The foreign matter E removed from the ink discharge nozzle is then collected in the tray T. The foreign matter E is thus readily collected.

Carry-Out Step S3

In the carry-out step S3, the first work robot 2A grips the workpiece W having undergone the work step S2 and transports the gripped workpiece W out of the field of view of the microscope 3. In the present embodiment, the workpiece W is transported into a tray 92 on the placement seat 9, as shown in FIG. 1. The controller 6 first detects the position of the tray 92 based on the image data D2 acquired by the peripheral camera 5. The controller 6 then produces the drive path along which the first work robot 2A is driven and which allows the first work robot 2A to appropriately transport the worked workpiece W out of the field of view of the microscope 3 to the tray 92 based on the detected information on the tray 92 and controls the operation of driving the first work robot 2A in such a way that the first work robot 2A moves along the drive path. The first work robot 2A thus transports the worked workpiece W out of the field of view of the microscope 3 into the tray 92 outside the field of view of the microscope 3.

Repeatedly performing the carry-in step S1, the work step S2, and the carry-out step S3 described above allows the first work robot 2A to successively process a large number of workpieces W without manpower. The workpieces W are thus processed with increased efficiency. When a predetermined amount of foreign matter E is collected in the tray T after a large number of workpieces W are successively processed, the first work robot 2A is used to replace the tray T with a new empty tray T before the next work step S2 is initiated. The method described above can eliminate an effort to collect the foreign matter E whenever the work step S2 is performed, whereby the period required to collect the foreign matter E can be shortened, and the workpiece W can be processed with increased efficiency.

As described above, in the present embodiment, the first work robot 2A performs all the carry-in step S1, the work step S2, and the carry-out step S3, but not necessarily. For example, the robot 2 may include a second work robot and a third work robot as well as the first work robot 2A; the first work robot 2A may perform the carry-in step S1, the second work robot may perform the work step S2, and the third work robot may perform the carry-out step S3. Instead, for example, a plurality of work robots may cooperatively perform the steps. For example, in the work step S2, a work robot may grip the workpiece W, and another work robot may remove the foreign matter E from the workpiece W. The work robots each do not necessarily have a specific configuration as long as the work robot can perform assigned work. For example, the work robots may each be a selective compliance assembly robot arm robot, such as the first work robot 2A, or any other robot.

For example, in the robot system 1 shown in FIG. 7, the robot 2 includes the first work robot 2A that performs the work step S2, and a second work robot 2B that performs the carry-in step S1 and the carry-out step S3. The second work robot 2B has a handler-like configuration and includes a linear slider 2B1, which transports stages ST, on each of which a workpiece W is placed, and a pickup apparatus 2B2, which transports an unworked workpiece W on the stage ST into the field of view of the microscope 3 and transports the worked workpiece W out of the field of view of the microscope 3 onto the stage ST. In the configuration shown in FIG. 7, a robot having the same configuration as that of the first work robot 2A is used as the pickup apparatus 2B2, but not necessarily.

In the thus configured robot system 1, the linear slider 2B1 first transports an unworked workpiece W to a position close to the stage 33, and the pickup apparatus 2B2 then picks up the unworked workpiece W on the stage ST and transports the unworked workpiece W into the field of view of the microscope 3. The carry-in step S1 is thus completed. The first work robot 2A then performs predetermined work on the workpiece W to complete the work step S2. The pickup apparatus 2B2 then picks up the worked workpiece W and transports the worked workpiece W out of the field of view of the microscope 3 onto the original stage ST. When the worked workpiece W is placed on the original stage ST, the linear slider 2B1 transports a new unworked workpiece W to the position close to the stage 33. The worked workpiece W may be transported onto another stage instead of the original stage ST.

Further, as a variation of the configuration shown in FIG. 7, the linear slider 2B1 may be so disposed as to pass through the position immediately below the objective lens 32. In the configuration described above, for example, the linear slider 2B1 first directly carries an unworked workpiece W along with the stage ST into the field of view of the microscope 3. The first work robot 2A is then used to perform work on the workpiece W. The linear slider 2B1 then carries the worked workpiece W out of the field of view of the microscope 3. The workpiece W is thus smoothly transported into the field of view of the microscope 3, whereby the work period can be shortened. Further, the pickup apparatus 2B2 is not required, whereby the configuration of the robot 2 is further simplified.

Further, the robot system 1 according to the present embodiment is a full-automatic robot system 1 in which the controller 6 controls the first work robot 2A based on the image data D1 and D2, as described above, but not necessarily, and the semi-automatic robot system 1 may be employed. That is, for example, the robot system 1 may further include a display apparatus 7, which displays the image data D1 and D2, and an input apparatus 8 coupled to the controller 6, as shown in FIG. 8. A worker issues an instruction to the first work robot 2A via the input apparatus 8 while checking the image data D1 and D2 displayed on the display apparatus 7, and the controller 6 may control the operation of driving the first work robot 2A based on the instruction. Work that reflects the worker's intention can thus be performed. Further, individual differences in the workpiece W are readily handled, and the work precision is improved in some cases. The display apparatus 7 is not limited to a specific apparatus and can, for example, be a monitor display or a head mounted display. The input apparatus 8 is not limited to a specific apparatus and can, for example, be a mouse, a keyboard, a touch panel, or a joystick.

As described above, the workpiece processing method includes the carry-in step S1 of carrying the workpiece W into the field of view of the microscope 3, which is a magnifier, the work step S2 of performing predetermined work on the workpiece W based on the image data D1 provided via the microscope 3, and the carry-out step S3 of carrying the workpiece W out of the field of view of the microscope 3. The robot 2 performs at least one of the carry-in step S1 and the carry-out step S3 as well as the work step S2. A workpiece processing method that can provide high work efficiency is thus provided.

In particular, in the workpiece processing method according to the present embodiment, the first work robot 2A performs the carry-in step S1, the work step S2, and the carry-out step S3, as described above. A workpiece processing method that can provide high work efficiency is thus provided. No manpower is required to perform the carry-in step S1 and the carry-out step S3, whereby manpower required in the related art can be saved.

In the work step S2, the foreign matter E is removed from the workpiece W, as described above. When the first work robot 2A can perform such work, the number of types of workpiece W that the first work robot 2A can handle increases, resulting in enhancement of the convenience provided by the work processing method.

In the work step S2, the foreign matter E removed from the workpiece W is collected in the tray T, which is a container, as described above. The period required to collect the foreign matter E is thus shortened, whereby the workpiece W can be processed with increased efficiency.

Further, in at least one of the carry-in step S1 and the carry-out step S3, the robot 2 moves the workpiece W based on the image data D2 on the workpiece W captured with the peripheral camera 5, which is an imaging apparatus located outside the field of view of the microscope 3, as described above. The carry-in step S1 and the carry-out step S3 can thus be smoothly and precisely performed. Particularly in the present embodiment, the robot 2 moves the workpiece W based on the image data D2 both in the carry-in step S1 and the carry-out step S3. The effects described above are thus more prominently provided.

Second Embodiment

Figure 9:
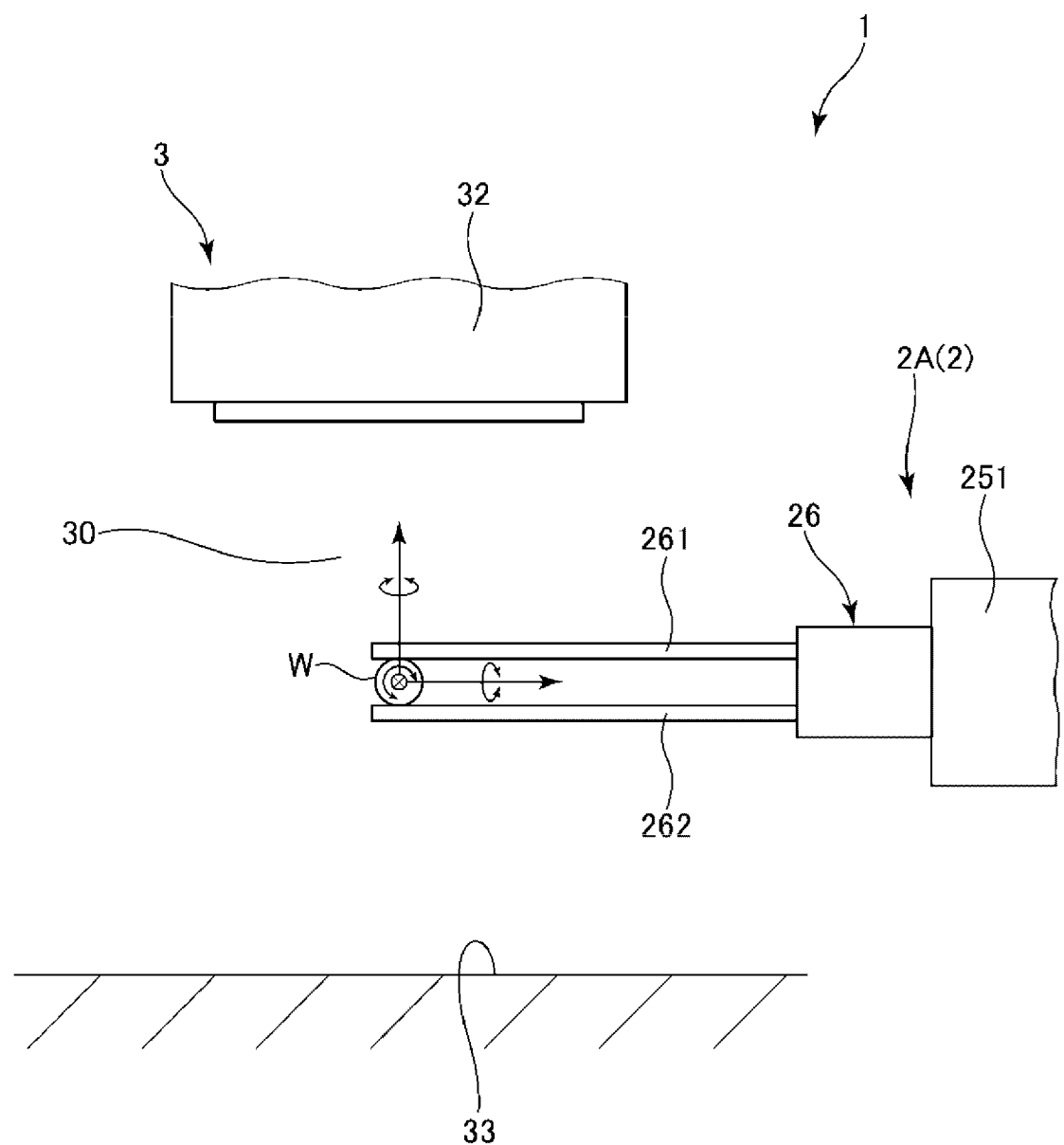
FIG. 9 is a side view showing a specific example of the work step in the workpiece processing method according to a second embodiment of the present disclosure.

FIG. 9 is a side view showing a specific example of the work step in the workpiece processing method according to a second embodiment of the present disclosure.

The workpiece processing method according to the present embodiment is the same as the workpiece processing method according to the first embodiment described above except that the work performed in the work step S2 is different. Therefore, in the following description, the workpiece processing method according to the second embodiment will be described primarily on the difference from the first embodiment described above, and the same items will not be described. In FIG. 9, the same configurations as those in the embodiment described above have the same reference characters.

Work Step S2

In the work step S2, at least one of the position and attitude of the workpiece W is changed to a predetermined position and attitude of the workpiece W, and the external appearance of the workpiece W is then inspected. When the work described above can be performed, the convenience provided by the workpiece processing method can be enhanced. Specifically, the first work robot 2A first grips the workpiece W and moves the workpiece W to a predetermined position, for example, the center of the field of view of the microscope 3. The first work robot 2A then rotates the workpiece W at the location where the workpiece W is present to cause the workpiece W to take a predetermined attitude, for example, an attitude that causes an inspected surface of the workpiece W to face the objective lens 32, as shown in FIG. 9. The microscope camera 4 then captures an image of the inspected surface of the workpiece W, and the controller 6 inspects the inspected surface based on the image data D1. The first work robot 2A can make eucentric motion, as described above. The work of rotating the workpiece W at the location where the workpiece W is present to change the orientation of the workpiece W can therefore be readily performed. Therefore, the work step S2 can be precisely performed, and the work period can be shortened.

The workpiece W is not limited to a specific workpiece and may be any workpiece that requires inspection, for example, a ring, a neckless, earrings, a bracelet and other accessories, a timepiece, a jewel, and other ornaments, a quartz oscillator, a gear, an IC, and other parts. The content of the inspection is not limited to a specific content and may, for example, be inspection of whether or not scratches or missing portions are present on the surface of the variety of workpieces W described above and inspection of whether or not disconnection of electric wiring has occurred.

As described above, in the work step S2 in the present embodiment, at least one of the position and attitude of the workpiece W is changed. The microscope 3 can thus be used to observe the workpiece W in a variety of directions.

In the work step S2, the workpiece W is caused to take a predetermined position and attitude, as described above. The microscope 3 can thus be used to reliably observe a desired location of the workpiece W.

In the work step S2, the workpiece W is inspected based on the image data D1, as described above. When the work described above can be performed, the convenience provided by the workpiece processing method can be enhanced.

The thus configured second embodiment can provide the same effects as those provided by the first embodiment described above.

Third Embodiment

Figure 10:
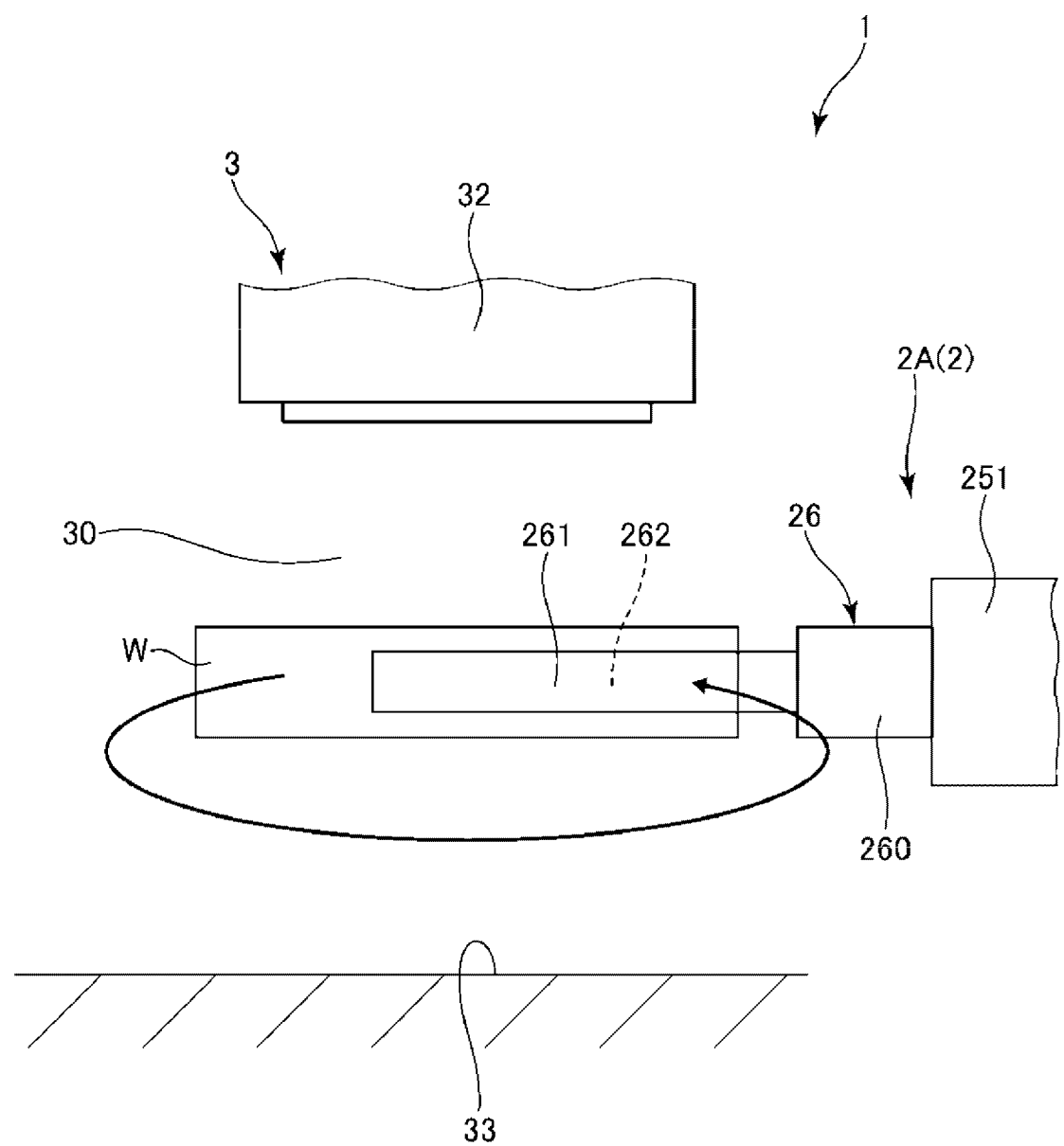
FIG. 10 is a side view showing a specific example of the work step in the workpiece processing method according to a third embodiment of the present disclosure.

FIG. 10 is a side view showing a specific example of the work step in the workpiece processing method according to a third embodiment of the present disclosure.

The workpiece processing method according to the present embodiment is the same as the workpiece processing method according to the first embodiment described above except that the work performed in the work step S2 is different. Therefore, in the following description, the workpiece processing method according to the third embodiment will be described primarily on the difference from the first embodiment described above, and the same items will not be described. In FIG. 10, the same configurations as those in the embodiments described above have the same reference characters.

Work Step S2

In the work step S2, the workpiece W is caused to vibrate to stir a liquid stored in the workpiece W. When the work described above can be performed, the convenience provided by the workpiece processing method is enhanced. For example, the workpiece W is a petri dish, a culture solution as the liquid is stored in the workpiece W, and a plurality of cells are cultured in the culture solution. In this case, the first work robot 2A first grips the workpiece W and swings the workpiece W to cause the workpiece W to vibrate. In the present embodiment, the workpiece W is so rotated as to draw an arc at high speed, as shown in FIG. 10. The culture solution is therefore stirred, and the cells aggregated in the culture solution are separate from one another. In particular, the first work robot 2A can make eucentric motion. Therefore, the workpiece W is so rotated at the location where the workpiece W is present that the culture solution is whirled and therefore stirred. The aggregated cells can thus be separate from one another with no excessive stress applied to the cells. Thereafter, the first work robot 2A places the workpiece W on the stage 33 and then collects the cells from the culture solution.

In the present embodiment, the first work robot 2A performs the work of stirring the culture solution and the work of collecting the cells from the culture solution. Instead, since the configuration of the end effector 26 optimized for the stirring work differs from that for the collecting work, the work of stirring the culture solution and the work of collecting the cells from the culture solution are preferably performed by separate work robots. The work step S2 can thus be more smoothly performed.

The workpiece W stores a liquid therein, as described above. In the work step S2, the workpiece W is caused to vibrate to stir the liquid. When the work described above can be performed, the convenience provided by the work piece processing method is enhanced.

The thus configured third embodiment can provide the same effects as those provided by the first embodiment described above.

Fourth Embodiment

Figure 11:
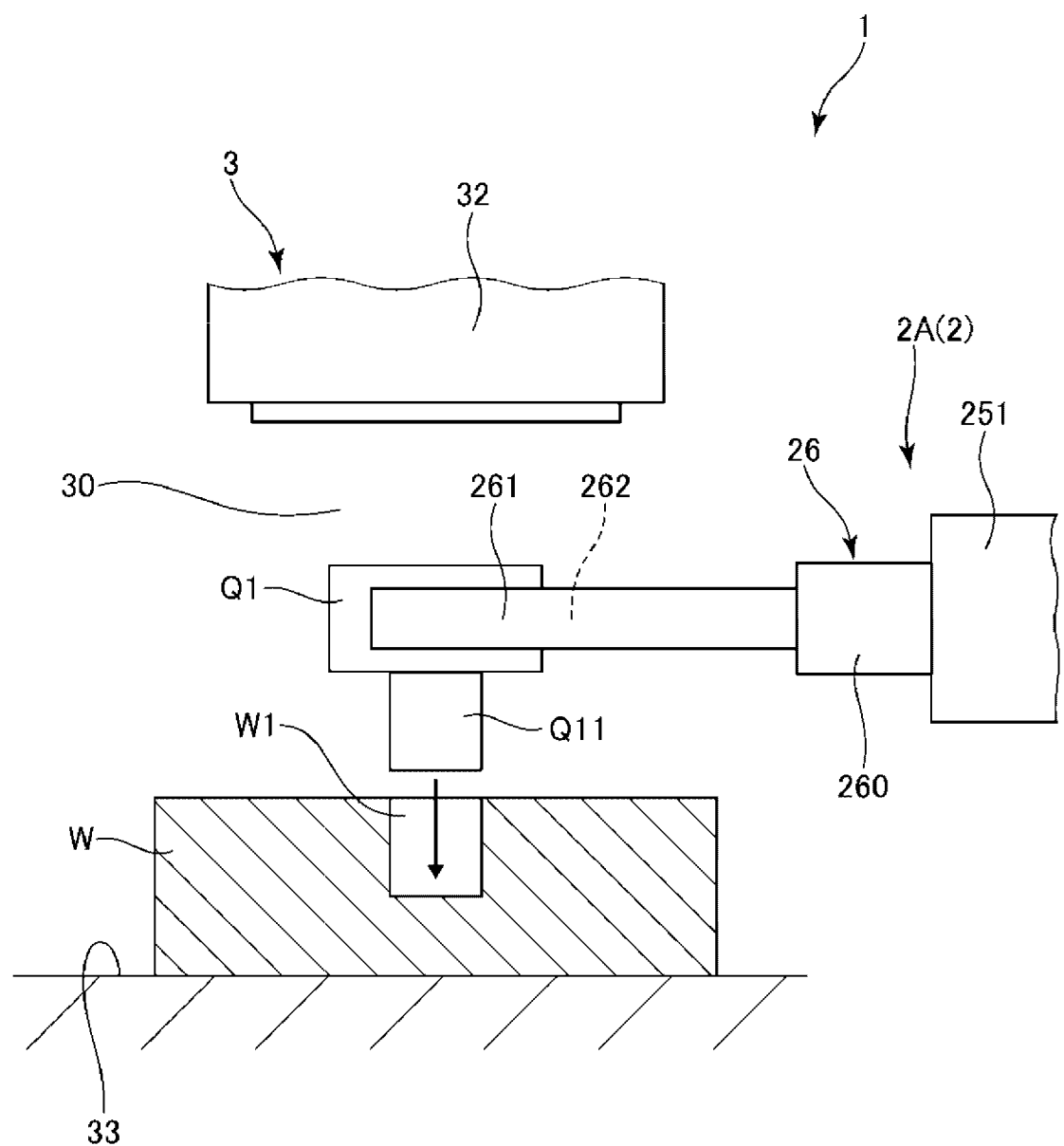
FIG. 11 is a side view showing a specific example of the work step in the workpiece processing method according to a fourth embodiment of the present disclosure.
Figure 12:
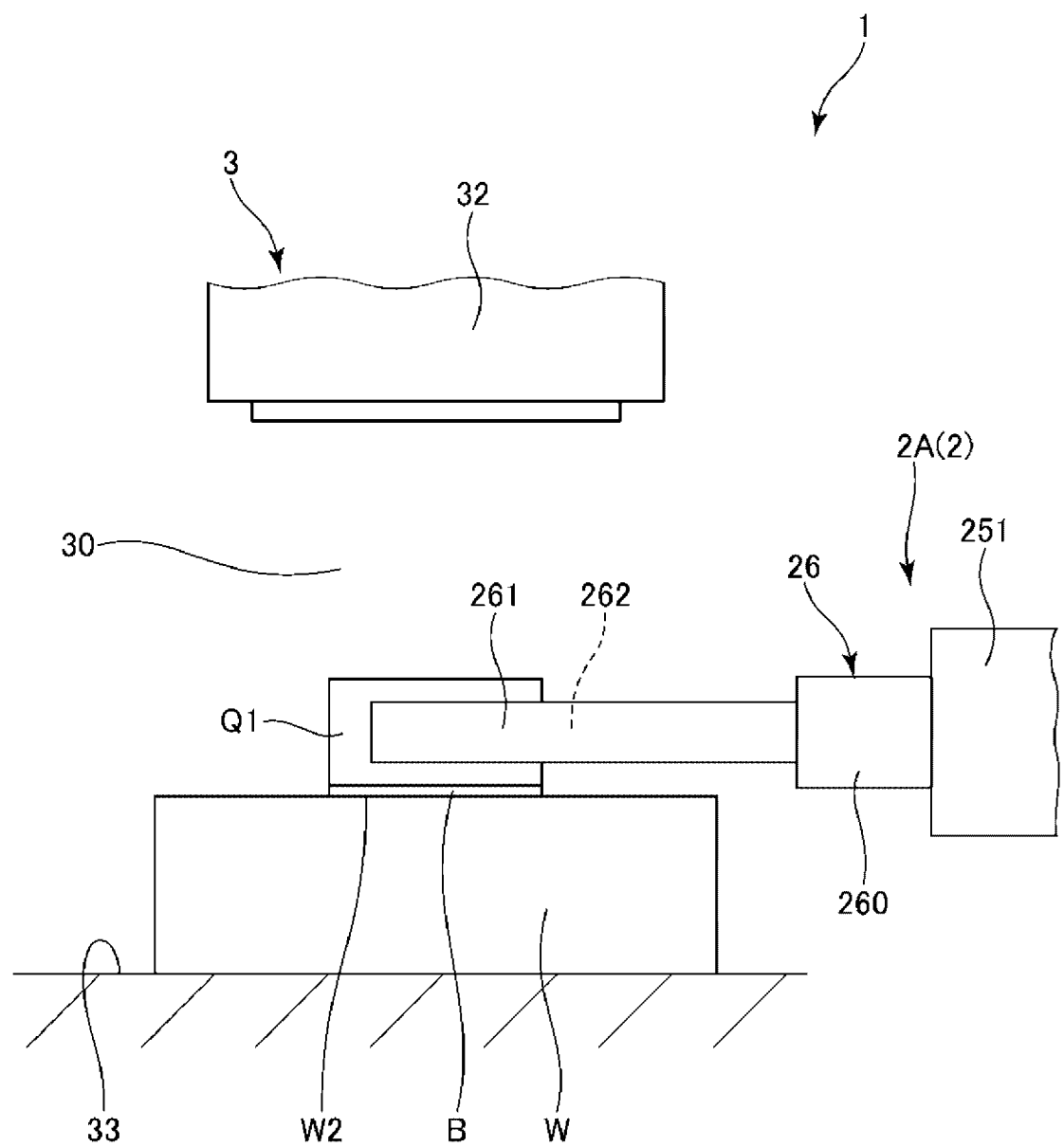
FIG. 12 is a side view showing the specific example of the work step in the workpiece processing method according to the fourth embodiment of the present disclosure.
Figure 13:
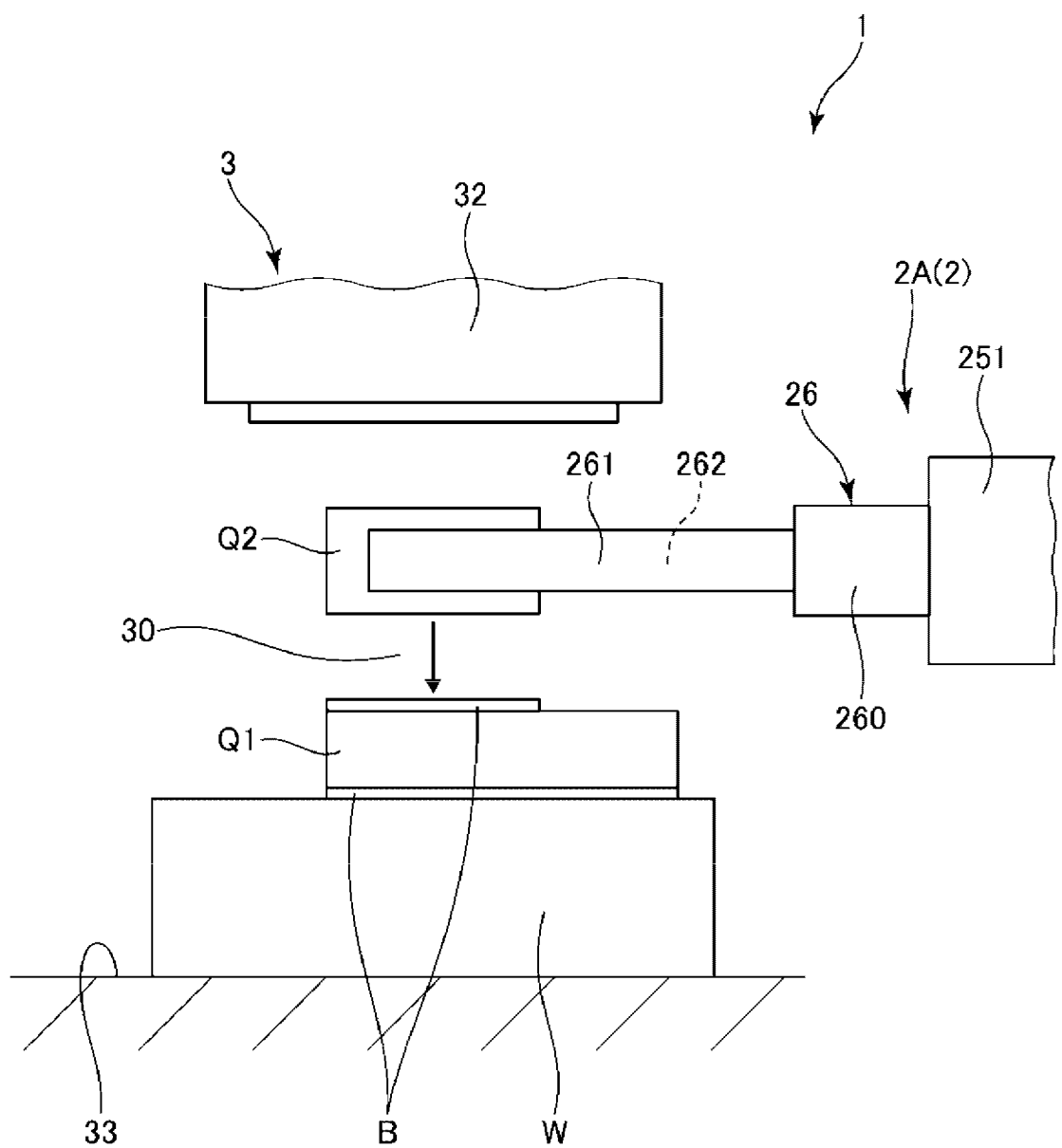
FIG. 13 is a side view showing the specific example of the work step in the workpiece processing method according to the fourth embodiment of the present disclosure.

FIGS. 11 to 13 are side views showing a specific example of the work step in the workpiece processing method according to a fourth embodiment of the present disclosure.

The workpiece processing method according to the present embodiment is the same as the workpiece processing method according to the first embodiment described above except that the work performed in the work step S2 is different. Therefore, in the following description, the workpiece processing method according to the fourth embodiment will be described primarily on the difference from the first embodiment described above, and the same items will not be described. In FIG. 11, the same configurations as those in the embodiments described above have the same reference characters.

Work Step S2

In the work step S2, a first target object Q1 is coupled to the workpiece W. When the work described above can be performed, the convenience provided by the workpiece processing method is enhanced. For example, a protrusion Q11 of the first target object Q1 is fit into a hole W1 formed in the workpiece W, as shown in FIG. 11. The procedure of the work described above is not limited to a specific procedure. For example, in the carry-in step S1, the first work robot 2A first carries the workpiece W and the first target object Q1 into the field of view of the microscope 3. The first work robot 2A then grips the workpiece W and places the workpiece W in a predetermined attitude, for example, in the attitude that causes the hole W1 to face the objective lens 32 in a predetermined position on the stage 33. The first work robot 2A then grips the first target object Q1 and fits the protrusion Q11 into the hole W1.

In the present embodiment, only the first work robot 2A performs the work of fitting the protrusion Q11 into the hole W1, but not necessarily. For example, the first work robot 2A may grip the workpiece W or press the workpiece W against the stage 33 to fix the workpiece W to the stage 33, and second work robot that is another robot may grip the first target object Q1 and fit the protrusion Q11 into the hole W1. A plurality of work robots can thus cooperate with one another to smoothly perform the work in a short period.

As another type of work, for example, the first target object Q1 is bonded to a placement surface W2 of the workpiece W, as shown in FIG. 12. The procedure of the work is not limited to a specific procedure. For example, in the carry-in step S1, the first work robot 2A first carries the workpiece W and the first target object Q1 into the field of view of the microscope 3. The first work robot 2A then grips the workpiece W and places the workpiece W in a predetermined attitude, for example, in the attitude that causes the placement surface W2 to face the objective lens 32 in a predetermined position on the stage 33. The first work robot 2A then applies an adhesive B onto the placement surface W2 of the workpiece W. The first work robot 2A then grips the first target object Q1 and bonds the first target object Q1 to the placement surface W2.

In the present embodiment, only the first work robot 2A performs the work of bonding the first target object Q1 to the placement surface W2, but not necessarily. For example, the first work robot 2A to which the grip-type end effector 26 is attached may grip the workpiece W or press the workpiece W against the stage 33 to fix the workpiece W to the stage 33, a second work robot to which the dispenser-type end effector 26, which supplies the adhesive B, is attached or a second work robot including the end effector 26 that grips a dispenser that supplies the adhesive B may apply the adhesive B onto the placement surface W2, and a third work robot to which the grip-type end effector 26 is attached may grip the first target object Q1 and bond the first target object Q1 to the placement surface W2. A plurality of work robots can thus cooperate with one another to smoothly perform the work in a short period.

The workpiece W, the first target object Q1, or the adhesive B is not limited to a specific example. For example, the workpiece W may be a wiring substrate, the first target object Q1 may be a circuit element, and the adhesive B may be an electrically conductive adhesive or solder that mechanically or electrically couples the circuit element to the wiring substrate.

When the work described above can be performed, the convenience provided by the workpiece processing method is particularly enhanced. For example, minute parts can be precisely assembled or otherwise handled based on the workpiece W. In the work step S2, after the first target object Q1 is coupled to the workpiece W, a second target object Q2 may further be coupled to the workpiece W, as shown in FIG. 13. The procedure of the work described above is not limited to a specific procedure. For example, the first work robot 2A may carry the second target object Q2 as well as the workpiece W and the first target object Q1 in advance into the field of view of the microscope 3 before the first target object Q1 is coupled to the workpiece W, and the first work robot 2A may grip the second target object in the field of view and couples the second target object Q2 to the workpiece W after and the first target object Q1 is coupled to the workpiece W. Instead, after the coupling between the workpiece W and the first target object Q1 is completed, the first work robot 2A may grip the second target object Q2 outside the field of view of the microscope 3, carry the second target object Q2 into the field of view, and directly couple the second target object Q2 to the workpiece W. The work described above allows a plurality of parts to be coupled to the workpiece W, whereby the convenience provided by the workpiece processing method is enhanced.

In the work step S2, the first target object Q1 is coupled to the workpiece W, as described above. When the work described above can be performed, the convenience provided by the workpiece processing method is enhanced. In particular, in the work step S2, the first target object Q1 is fit to the workpiece W. Instead, in the work step S2, the first target object Q1 is bonded to the workpiece W. The convenience provided by the workpiece processing method is thus further enhanced.

In the work step S2, the first target object Q1 is coupled to the workpiece W, and the second target object Q2 is then further coupled to the workpiece W, as described above. The convenience provided by the workpiece processing method is thus further enhanced.

The thus configured fourth embodiment can also provide the same effects as those provided by the first embodiment described above.

The workpiece processing method according to the present disclosure has been described above based on the illustrated embodiments, but the present disclosure is not limited thereto, and the configuration of each portion can be replaced with an arbitrary configuration having the same function. Further, another arbitrary constituent element may be added to any of the embodiments described above. Moreover, the embodiments described above may be combined as appropriate with each other.

What is claimed is:

1. A workpiece processing method, the method comprising:
    a carry-in step of carrying a workpiece placed in a tray on a placement seat outside a field of view of a magnifier into the field of view of the magnifier according to a shape, a position, and an attitude of the workpiece in the tray detected based on an image data obtained by capturing an image of a region around and outside the field of view of the magnifier using a peripheral camera disposed in a position above the magnifier,
    a work step of performing predetermined work on the workpiece based on an image data provided via the magnifier; and
    a carry-out step of carrying the workpiece having undergone the work step out of the field of view of the magnifier into another tray on the placement seat according to a position of another tray detected based on the image data obtained by capturing the region around and outside the field of view of the magnifier using the peripheral camera,
    wherein a robot performs the work step, the carry-in step and the carry-out step.

2. The workpiece processing method according to claim 1, wherein a foreign matter is removed from the workpiece in the work step.

3. The workpiece processing method according to claim 2, wherein the foreign matter removed from the workpiece is collected in a container in the work step.

4. The workpiece processing method according to claim 1, wherein at least one of a position and an attitude of the workpiece is changed in the work step.

5. The workpiece processing method according to claim 4, wherein the workpiece is inspected based on the image data provided by the magnifier in the work step.

6. The workpiece processing method according to claim 4, wherein the workpiece is caused to take a predetermined position and attitude in the work step.

7. The workpiece processing method according to claim 4,
    wherein the workpiece stores a liquid therein, and
    the workpiece is caused to vibrate to stir the liquid in the work step.

8. The workpiece processing method according to claim 1, wherein a first target object is coupled to the workpiece in the work step.

9. The workpiece processing method according to claim 8, wherein the first target object is fit to the workpiece in the work step.

10. The workpiece processing method according to claim 8, wherein the first target object is bonded to the workpiece in the work step.

11. The workpiece processing method according to claim 8, wherein the first target object is coupled to the workpiece, and a second target object is then further coupled to the workpiece in the work step.

* * * * *